United States Patent
Saito

(10) Patent No.: US 11,845,417 B2
(45) Date of Patent: Dec. 19, 2023

(54) CONTROL APPARATUS FOR ELECTRIC VEHICLE

(71) Applicant: Mazda Motor Corporation, Hiroshima (JP)

(72) Inventor: Hiroyuki Saito, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 17/744,751

(22) Filed: May 16, 2022

(65) Prior Publication Data
US 2022/0379871 A1 Dec. 1, 2022

(30) Foreign Application Priority Data
May 31, 2021 (JP) ................................. 2021-091091

(51) Int. Cl.
| | |
|---|---|
| B60W 20/13 | (2016.01) |
| B60W 10/06 | (2006.01) |
| B60W 10/08 | (2006.01) |
| F02N 11/04 | (2006.01) |
| F02N 11/08 | (2006.01) |
| F02D 41/04 | (2006.01) |

(52) U.S. Cl.
CPC ............ B60W 20/13 (2016.01); B60W 10/06 (2013.01); B60W 10/08 (2013.01); F02D 41/042 (2013.01); F02N 11/04 (2013.01); F02N 11/0825 (2013.01); F02N 11/0859 (2013.01); B60W 2510/0685 (2013.01); B60W 2510/244 (2013.01); B60W 2710/00 (2013.01); B60W 2710/08 (2013.01); F02N 2200/061 (2013.01)

(58) Field of Classification Search
CPC .... F02N 19/005; F02N 11/0814; F02N 11/04; F02N 2019/008; F02N 11/0855; F02N 11/00; F02N 11/0844; B60W 10/08; B60W 20/00; B60W 10/06
USPC ......................... 701/22, 112, 113; 123/179.4
See application file for complete search history.

(56) References Cited

U.S. PATENT DOCUMENTS

| | | | | |
|---|---|---|---|---|
| 6,177,734 | B1 * | 1/2001 | Masberg ............... | B60K 6/485 290/40 C |
| 6,453,863 | B1 * | 9/2002 | Pels ....................... | F02N 11/04 123/179.3 |

(Continued)

FOREIGN PATENT DOCUMENTS

| | | | | |
|---|---|---|---|---|
| JP | 2013-67334 A | 4/2013 | | |
| WO | WO-2008026355 A1 * | 3/2008 | ............ | B60K 6/365 |

*Primary Examiner* — Sizo B Vilakazi
*Assistant Examiner* — Brian R Kirby
(74) *Attorney, Agent, or Firm* — XSENSUS LLP

(57) ABSTRACT

A control apparatus for an electric vehicle includes a first motor (traveling motor) for traveling, a battery (high-voltage battery), a second motor (generator motor) for electricity generation, an engine (rotary engine), a first controller (engine ECU), a second controller (motor ECU), and a sensor (voltage-current sensor). The second controller is configured to start the engine by causing the second motor to perform power running, cause the second motor to perform electricity generation driving such that the battery is charged, and adjust a stop position of the engine by causing the second motor to perform power running subsequently to a stop of the engine by the first controller in a case where a state of charge of the battery becomes high and the second motor finishes the electricity generation driving.

6 Claims, 6 Drawing Sheets

(56) References Cited

U.S. PATENT DOCUMENTS

| | | | | |
|---|---|---|---|---|
| 6,834,632 | B2* | 12/2004 | Kataoka | F02N 99/006 |
| | | | | 123/179.3 |
| 7,066,127 | B2* | 6/2006 | Flanagan | F01L 1/24 |
| | | | | 123/198 R |
| 2003/0140880 | A1* | 7/2003 | Kahlon | B60L 50/16 |
| | | | | 123/179.3 |
| 2003/0176964 | A1* | 9/2003 | Turner | F02N 11/04 |
| | | | | 701/115 |
| 2006/0241851 | A1* | 10/2006 | Berger | F02D 13/08 |
| | | | | 701/112 |
| 2007/0018524 | A1* | 1/2007 | Yonemori | H02P 9/40 |
| | | | | 310/171 |
| 2010/0025131 | A1* | 2/2010 | Gloceri | B60K 6/52 |
| | | | | 180/65.265 |
| 2010/0251984 | A1* | 10/2010 | Bouchon | B60W 10/06 |
| | | | | 123/179.3 |
| 2013/0075173 | A1 | 3/2013 | Kato et al. | |
| 2013/0274978 | A1* | 10/2013 | Lemp | B60W 10/06 |
| | | | | 180/65.265 |
| 2016/0214598 | A1* | 7/2016 | Tabata | B60K 6/445 |
| 2019/0299973 | A1* | 10/2019 | Morita | B60W 20/14 |
| 2022/0247332 | A1* | 8/2022 | McRoberts | H02P 6/18 |

\* cited by examiner

CONTROL APPARATUS FOR ELECTRIC VEHICLE

CROSS-REFERENCE TO RELATED APPLICATION

The present application claims priority to Japanese Patent Application 2021-091091, filed May 31, 2021, the entire contents of which are incorporated herein by reference.

TECHNICAL FIELD

The technique disclosed herein relates to a control apparatus for an electric vehicle.

BACKGROUND

Patent Literature 1 discloses an electric automobile. A generator motor and an engine which drives the generator motor are installed in this electric automobile. The generator motor starts the engine by performing power running in a case where state of charge (SOC) of a battery lowers.
[Patent Literature 1] Japanese Patent Laid-Open No. 2017-52500

SUMMARY

Problems to be Solved

When a revolution position of an engine is not in a proper position in a case where the engine is started, fuel supplied to the engine may not be ignited, or a time is needed before a start is completed. Accordingly, it is possible that the revolution position of the engine is adjusted to a proper position by using a motor used for starting the engine before the engine is started. However, because an SOC of a battery is lowered before the engine starts, it is not preferable to consume electric power of the battery for adjustment of the revolution position.

Solutions for Solving the Problems

The technique disclosed herein starts an engine while setting a revolution position of an engine to a proper position.

The technique disclosed herein relates to a control apparatus for an electric vehicle. The control apparatus for an electric vehicle includes:
 a first motor for traveling which is mechanically connected with a drive wheel of a vehicle;
 a battery which is electrically connected with the first motor and supplies electric power to the first motor;
 a second motor for electricity generation which is electrically connected with the battery;
 an engine that has a shaft with which the second motor is mechanically connected and that produces a driving force for moving the second motor;
 a first controller which drives the engine;
 a second controller which drives the second motor; and
 a sensor which outputs an electric signal related to an SOC of the battery to the second controller, and
 the second controller has
 a start control unit which starts the engine by causing the second motor to perform power running based on the electric signal of the sensor in a case where the SOC of the battery is lowered,
 an electricity generation control unit which causes the second motor to perform electricity generation driving after the engine is started such that the battery is charged, and
 a stop position control unit which adjusts a stop position of the engine by causing the second motor to perform power running subsequently to a stop of the engine by the first controller in a case where the SOC of the battery becomes high and the second motor finishes the electricity generation driving based on the electric signal of the sensor.

With this configuration, the electric vehicle includes the first motor, the second motor, and the engine. The first motor is a motor for traveling of the electric vehicle. The second motor is a motor for electricity generation. The engine is driven, and the second motor thereby generates electricity. Further, the second motor and the engine are mechanically connected together, and the second motor performs power running when the engine is started.

The first controller which drives the engine and the second controller which drives the second motor are independent from each other. The second controller has the start control unit, the electricity generation control unit, and the stop position control unit. When the SOC of the battery lowers, the start control unit starts the engine by using the second motor. The electricity generation control unit causes the second motor to perform the electricity generation driving. Accordingly, the battery is charged.

When the SOC of the battery becomes high, the second motor finishes the electricity generation driving. The stop position control unit causes the second motor to perform power running subsequently to a stop of the engine by the first controller. Accordingly, the stop position control unit adjusts the stop position of the engine. The engine can start from a proper revolution position in a start in the next time. The engine can quickly be started, and lowering of fuel efficiency performance and lowering of exhaust emission performance can be inhibited in addition.

The stop position control unit also adjusts a revolution position of the engine at a timing when the engine stops driving for electricity generation. Because the SOC of the battery is high at this timing, consumption of electric power of the battery for adjustment of the revolution position can be permitted.

The first controller and the second controller may be connected with each other via a communication line,
 the first controller may transmit position information of the engine to the second controller via the communication line, and
 the second controller may adjust the stop position of the engine based on the position information from the first controller.

Because the engine and the second motor are mechanically connected together, the relative position relationship between the revolution position of the engine and the rotation position of the second motor is always constant. The second controller can acquire position information of the engine and the second motor based on the position information of the engine from the first controller. The second controller adjusts the stop position of the engine based on the position information from the first controller, and the second controller can thereby adjust the revolution position of the engine to a proper position after driving of the engine is finished.

The second controller may receive the position information of the engine during the electricity generation driving by the second motor from the first controller.

The engine stably revolves during the electricity generation driving by the second motor. The second controller can acquire accurate position information of the engine from the first controller. The second controller can accurately recognize position information of the stopped engine based on the position information of the engine which is acquired during the electricity generation driving by the second motor. The second controller can adjust the revolution position to a proper position after driving of the engine is finished.

The engine may be a rotary engine, and
the second controller may adjust the stop position of the engine by causing the shaft of the rotary engine to rotate in a positive rotation direction.

When the rotary engine is caused to perform backward revolution, a side seal might be damaged due to interference between an end of the side seal mounted on a rotor and an opening of an intake port.

In a case where the revolution position of the rotary engine is adjusted, the second controller rotates the shaft in the positive rotation direction. Accordingly, damage to the side seal can be avoided.

As described above, the above control apparatus for an electric vehicle can start an engine while setting a revolution position of an engine to a proper position.

DETAILED DESCRIPTION

One or more aspects of a control apparatus for an electric vehicle will hereinafter be described with reference to drawings. The control device for an electric vehicle will be described herein as an example.

(General Configuration of Electric Vehicle)

Figure 1:
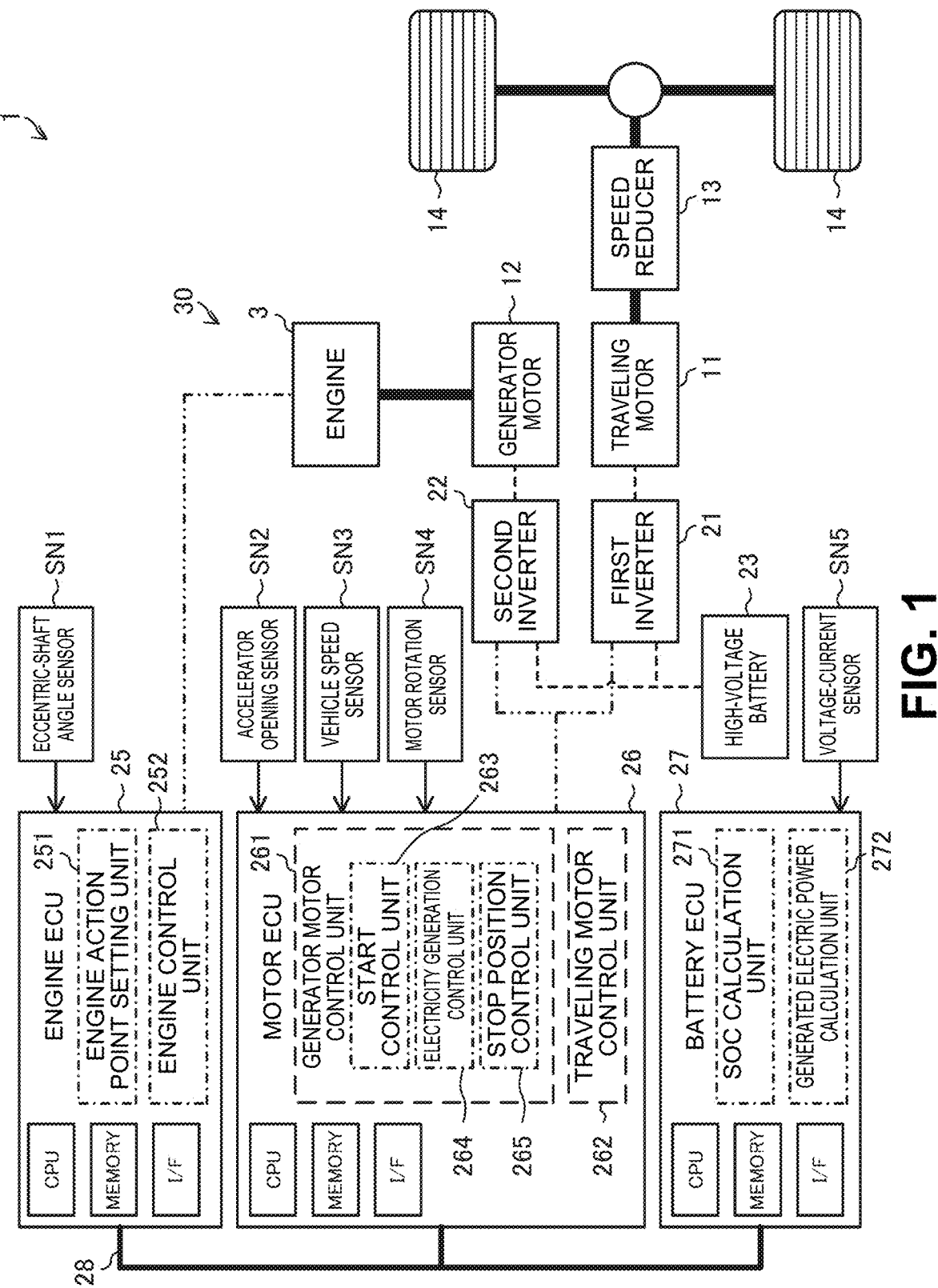
FIG. 1 illustrates an example control system of an electric vehicle.

FIG. 1 illustrates a control system of an electric vehicle. An electric vehicle 1 includes a traveling motor 11 for traveling. The traveling motor 11 is mechanically connected with drive wheels 14 and 14 via a speed reducer 13. The speed reducer 13 reduces a speed of an output of the traveling motor 11. When the output of the traveling motor 11 is transmitted to the drive wheels 14, the electric vehicle 1 travels.

The electric vehicle 1 includes a high-voltage battery 23. The high-voltage battery 23 accumulates electric power for traveling. The high-voltage battery 23 is a lithium-ion battery, for example.

The traveling motor 11 is electrically connected with the high-voltage battery 23 via a first inverter 21. The traveling motor 11 and the first inverter 21 are electrically connected together via a harness line indicated by a broken line in FIG. 1, and the first inverter 21 and the high-voltage battery 23 are electrically connected together via a harness line. The traveling motor 11 performs power running by being supplied with electric power from the high-voltage battery 23. The traveling motor 11 also performs electricity generation driving when the electric vehicle 1 decelerates. The first inverter 21 supplies regenerative electric power of the traveling motor 11 to the high-voltage battery 23. The high-voltage battery 23 is charged by the regenerative electric power of the traveling motor 11.

A range extender device 30 is installed in the electric vehicle 1. The range extender device 30 includes a generator motor 12 for electricity generation and an internal combustion engine which drives the generator motor 12. In the electric vehicle 1 raised here as an example, the internal combustion engine is a rotary engine 3.

A shaft of the rotary engine 3 is mechanically connected with the generator motor 12. When the rotary engine 3 is driven, the generator motor 12 performs electricity generation driving. Note that a configuration of the rotary engine 3 will later be described in detail.

The generator motor 12 is connected with the high-voltage battery 23 via a second inverter 22. The generator motor 12 and the second inverter 22 are electrically connected together via a harness line indicated by a broken line in FIG. 1, and the second inverter 22 and the high-voltage battery 23 are electrically connected together via a harness line. The second inverter 22 supplies electric power generated by the generator motor 12 to the high-voltage battery 23. The high-voltage battery 23 is charged by the electric power generated by the generator motor 12. Note that as described later, there may be a case where the generator motor 12 performs power running by being supplied with electric power from the high-voltage battery 23. The generator motor 12 also functions as a starter. The generator motor 12 starts the rotary engine 3 by applying a cranking torque to the rotary engine 3.

The electric vehicle 1 includes an engine ECU (electric control unit) 25, a motor ECU 26, and a battery ECU 27. Each of the engine ECU 25, the motor ECU 26, and the battery ECU 27 is a controller based on a known microcomputer. Each of the ECUs includes a central processing unit (CPU), a memory, and an I/F circuit. The CPU executes programs. The memory is configured with a RAM (random access memory) and a ROM (read-only memory), for example. The memory stores programs and data. The I/F circuit inputs and outputs electric signals.

The engine ECU 25, the motor ECU 26, and the battery ECU 27 are connected with each other via a CAN (car area network) communication line 28. The engine ECU 25, the motor ECU 26, and the battery ECU 27 can mutually transmit and receive signals via the CAN communication line 28.

The engine ECU 25 is electrically connected with the rotary engine 3 via a signal line indicated by a two-dot chain line. The engine ECU 25 controls the rotary engine 3. An eccentric-shaft angle sensor SN1 is connected with the engine ECU 25. The eccentric-shaft angle sensor SN1 outputs a signal related to rotation of an eccentric shaft 35 as an output shaft of the rotary engine 3. The engine ECU 25 can acquire information about a revolution position of the rotary engine 3 based on the signal of the eccentric-shaft angle sensor SN1.

The engine ECU 25 has, as function blocks, an engine operating point setting unit 251 and an engine control unit 252. Details of control of the rotary engine 3 by the engine ECU 25 will be described later.

The motor ECU 26 is electrically connected with the first inverter 21 and the second inverter 22 via signal lines indicated by two-dot chain lines. The motor ECU 26 controls the traveling motor 11 through the first inverter 21. The motor ECU 26 controls the generator motor 12 through the second inverter 22.

An accelerator opening sensor SN2, a vehicle speed sensor SN3, and a motor rotation sensor SN4 are connected with the motor ECU 26. The accelerator opening sensor SN2 outputs a signal corresponding to a depression amount of an accelerator pedal to the motor ECU 26. The vehicle speed sensor SN3 outputs a signal corresponding to a speed of the electric vehicle 1 to the motor ECU 26.

The motor rotation sensor SN4 outputs a signal related to rotation of the generator motor 12 to the motor ECU 26. The motor ECU 26 can recognize a rotation angle of the eccentric shaft 35 of the rotary engine 3, with which the generator motor 12 is mechanically connected, based on the signal of the motor rotation sensor SN4.

The motor rotation sensor SN4 also outputs signals related to rotations of the traveling motor 11 to the motor ECU 26.

The motor ECU 26 has, as function blocks, a generator motor control unit 261 and a traveling motor control unit 262. The generator motor control unit 261 has a start control unit 263, an electricity generation control unit 264, and a stop position control unit 265. Details of control of the generator motor 12 by the generator motor control unit 261 will be described later.

The traveling motor control unit 262 controls the traveling motor 11 based on the signals of the accelerator opening sensor SN2, the vehicle speed sensor SN3, and the motor rotation sensor SN4. Accordingly, the electric vehicle 1 performs acceleration or deceleration corresponding to a manipulation of the accelerator pedal by a driver.

A voltage-current sensor SN5 is connected with the battery ECU 27. The voltage-current sensor SN5 outputs a signal related to an output voltage and an output current of the high-voltage battery 23 to the battery ECU 27. The battery ECU 27 has, as function blocks, an SOC calculation unit 271 and a generated electric power calculation unit 272. The SOC calculation unit 271 calculates an SOC (state of charge) of the high-voltage battery 23 based on the signal from the voltage-current sensor SN5. In a case where charging for the high-voltage battery 23 is necessary, the generated electric power calculation unit 272 calculates a target electricity generation amount based on the SOC of the high-voltage battery 23.

(Configuration of Rotary Engine)

Figure 2:
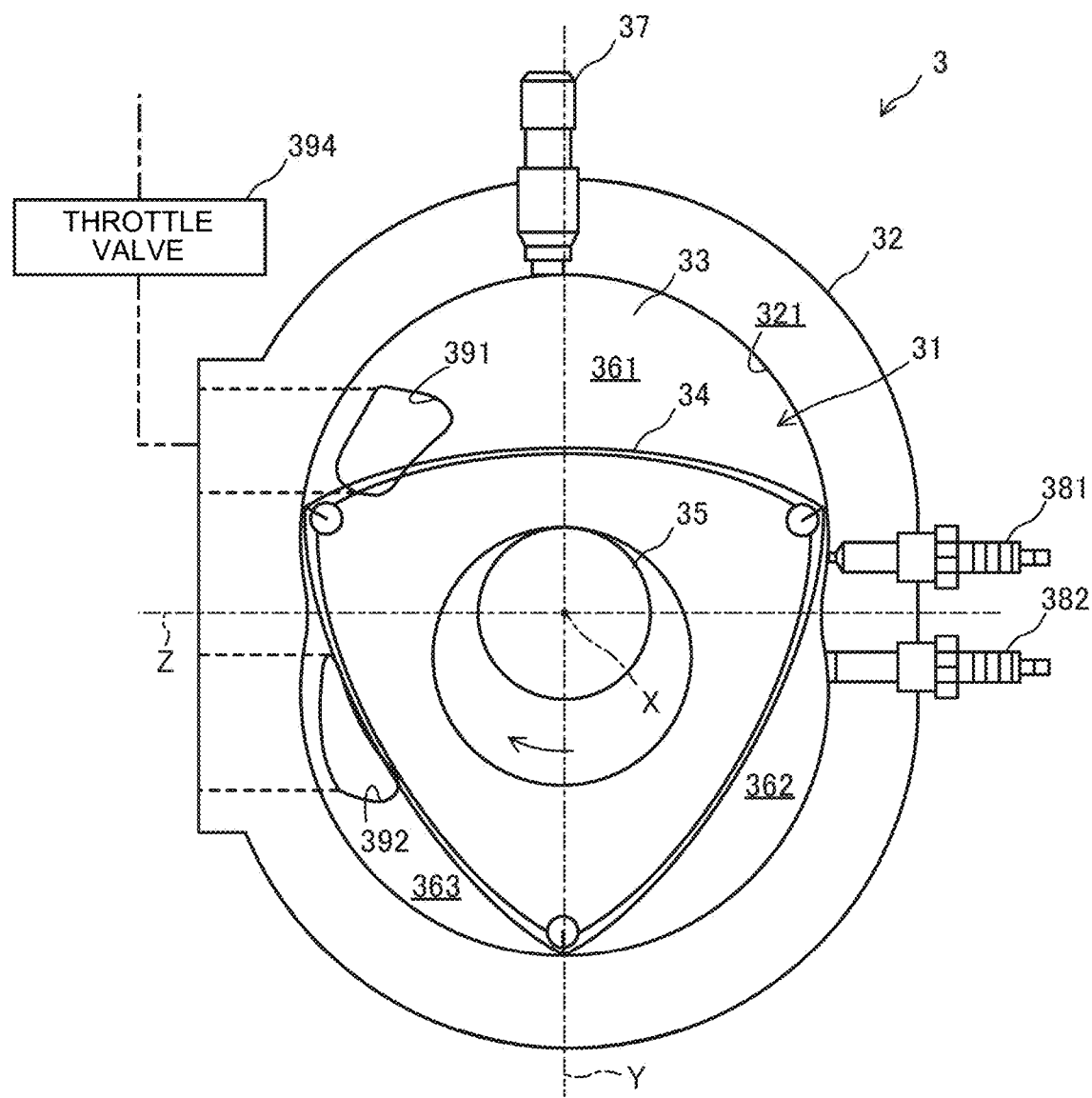
FIG. 2 illustrates an example rotary engine.

FIG. 2 illustrates the rotary engine 3 as an example. FIG. 2 illustrates, as an example, an internal configuration of the rotary engine 3 as seen from front. A front-rear direction of the rotary engine 3 corresponds to an axial direction of the eccentric shaft 35 and a direction orthogonal to the page of FIG. 2.

The rotary engine 3 has one rotor 34 and a rotor housing chamber 31. The rotor housing chamber 31 is formed with a rotor housing 32 and a side housing 33. The rotor housing 32 has a trochoidal inner peripheral surface 321. The rotor 34 is housed in the rotor housing chamber 31. The rotor 34 has a nearly triangular shape. The rotor housing chamber 31 is demarcated into three operation chambers of a first chamber 361, a second chamber 362, and a third chamber 363.

The eccentric shaft 35 is provided to pass through the rotor housing chamber 31. The rotor 34 is supported to perform planetary revolution motion with respect to the eccentric shaft 35. The rotor 34 revolves around the eccentric shaft 35 such that three top portions move along the trochoidal inner peripheral surface 321.

Figure 6:
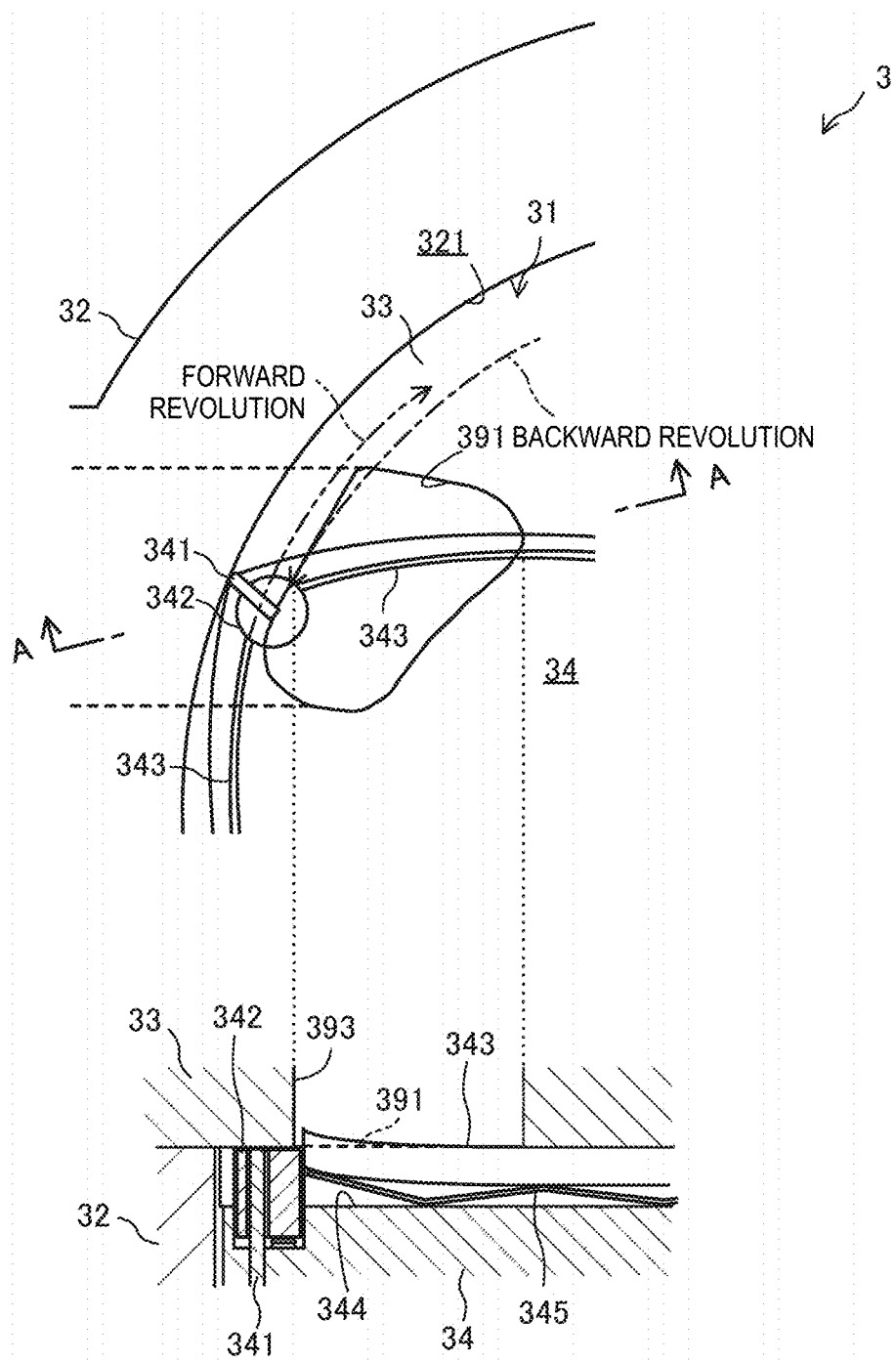
FIG. 6 illustrates an example interference state between a side seal of the rotary engine and an intake port.

As illustrated in FIG. 6 while being enlarged, an apex seal 341 is mounted on each of the top portions of the rotor 34. Further, generally circular columnar corner seals 342 are provided to both of front-rear end portions of each of the apex seals 341. In addition, side seals 343 are provided to both of front-rear side surfaces of the rotor 34. The side seals 343 couple the corner seals 342 with each other in substantially parallel with an outer peripheral edge of the rotor 34.

The apex seal 341 abuts the trochoidal inner peripheral surface 321 of the rotor housing 32. Accordingly, the apex seal 341 keeps airtightness of the operation chamber. The side seal 343 abuts the side housing 33. Accordingly, the side seal 343 keeps airtightness of the operation chamber. The corner seals 342 keep airtightness of a joined portion between the side seals 343 and the apex seal 341.

In response to revolution of the rotor 34 which is indicated by an arrow in FIG. 2, the first chamber 361, the second chamber 362, and the third chamber 363 are displaced around the eccentric shaft 35, and strokes of intake, compression, expansion, and exhaust are performed in each of the first chamber 361, the second chamber 362, and the third chamber 363. A rotational force produced by this is output from the eccentric shaft 35.

More specifically, the rotor 34 revolves in a clockwise direction in FIG. 2. The rotor housing chamber 31 can be divided into a left-upper region, a right-upper region, a right-lower region, and a left-lower region by a major axis Y and a minor axis Z which pass through a rotation axis X. Each of the operation chambers mostly performs an intake stroke in the left-upper region, mostly performs a compression stroke in the right-upper region, mostly performs an expansion stroke in the right-lower region, and mostly performs an exhaust stroke in the left-lower region.

An injector 37, a first spark plug 381, and a second spark plug 382 are mounted on the rotor housing 32. The injector 37 is mounted on a top portion of the rotor housing 32. The injector 37 injects fuel into the operation chamber in the intake stroke or in the compression stroke.

The first spark plug 381 is mounted on a right side wall portion of the rotor housing 32. The second spark plug 382 is also mounted on the right side wall portion of the rotor housing 32. The second spark plug 382 is positioned on an advancing side of the rotor 34 relative to the first spark plug 381. Each of the first spark plug 381 and the second spark plug 382 ignites air-fuel mixture in the operation chamber in the compression stroke.

In the side housing 33, an intake port 391 and an exhaust port 392 open. An opening of the intake port 391 is positioned in the left-upper region of the rotor housing chamber 31. The intake port 391 generally linearly extends, in an internal portion of the side housing 33, from this opening toward a left side in a horizontal direction. The opening of the intake port 391 opens and closes in response to revolution of the rotor 34. The intake port 391 communicates with the operation chamber in the intake stroke. The intake port 391 is connected with an intake passage. A throttle valve 394 is disposed in the intake passage. The throttle valve 394 is a throttling valve which adjusts an air amount to be supplied to the rotary engine 3.

An opening of the exhaust port 392 is positioned in the left-lower region of the rotor housing chamber 31. The opening of the exhaust port 392 is positioned below the opening of the intake port 391. The exhaust port 392 generally linearly extends, in an internal portion of the side housing 33, from this opening toward a left side in the horizontal direction. The opening of the exhaust port 392 opens and closes in response to revolution of the rotor 34. The exhaust port 392 communicates with the operation chamber in the exhaust stroke.

(Electricity Generation Control in Electric Vehicle)

Figure 3:
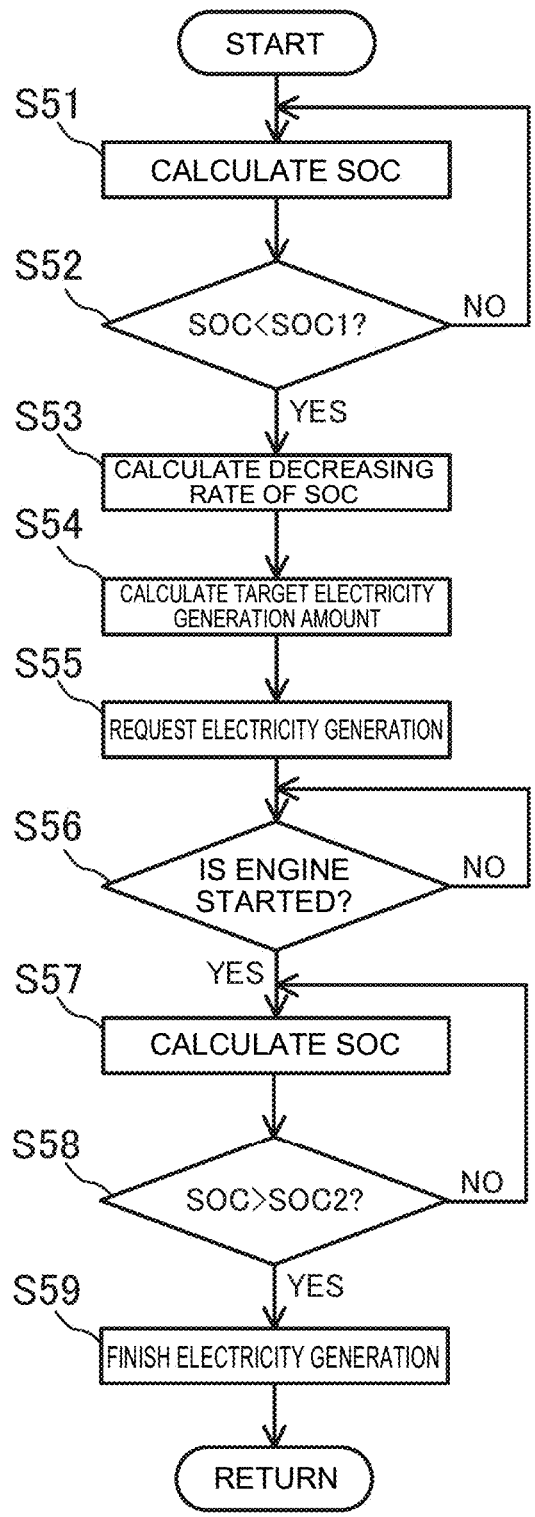
FIG. 3 illustrates an example procedure of battery management.

Next, electricity generation control in the electric vehicle 1 will be described with reference to FIGS. 3 to 5. The flowchart in FIG. 3 illustrates a management procedure of the high-voltage battery 23 which is executed by the battery ECU 27.

First, in step S51 after a start, the SOC calculation unit 271 of the battery ECU 27 calculates the SOC of the high-voltage battery 23 based on the signal from the voltage-current sensor SN5. In next step S52, the battery ECU 27 determines whether or not the calculated SOC is less than a first reference SOC1. In a case where the determination in step S52 is YES, the process progresses to S53. The battery ECU 27 determines that charging for the high-voltage battery 23 is necessary. In a case where the determination in step S52 is NO, the process returns to S51.

In step S53, the battery ECU 27 calculates a decreasing rate of the SOC, and in next step S54, the generated electric power calculation unit 272 of the battery ECU 27 calculates a target electricity generation amount in accordance with the calculated decreasing rate of the SOC. The battery ECU 27 makes the target electricity generation amount larger as the decreasing rate is higher.

When the target electricity generation amount is calculated, in step S55, the battery ECU 27 outputs an electricity generation request to each of the engine ECU 25 and the motor ECU 26 through the CAN communication line 28.

In step S56, the battery ECU 27 determines whether or not the rotary engine 3 is started based on information from the engine ECU 25. Until a start of the rotary engine 3 is completed, step S56 is repeated in the process, and when the start of the rotary engine 3 is completed, the process progresses to step S57.

When the rotary engine 3 is started and electricity generation by the generator motor 12 is started, in step S57, the SOC calculation unit 271 of the battery ECU 27 calculates the SOC of the high-voltage battery 23. In next step S58, the battery ECU 27 determines whether or not the calculated SOC exceeds a second reference SOC2. In a case where the determination in step S58 is NO, the process returns to S57, and the battery ECU 27 causes electricity generation to be continued. In a case where the determination in step S58 is YES, the process progresses to S59. In step S59, the battery ECU 27 assumes that charging for the high-voltage battery 23 is completed and outputs an end of electricity generation to each of the engine ECU 25 and the motor ECU 26 through the CAN communication line 28.

Figure 4:
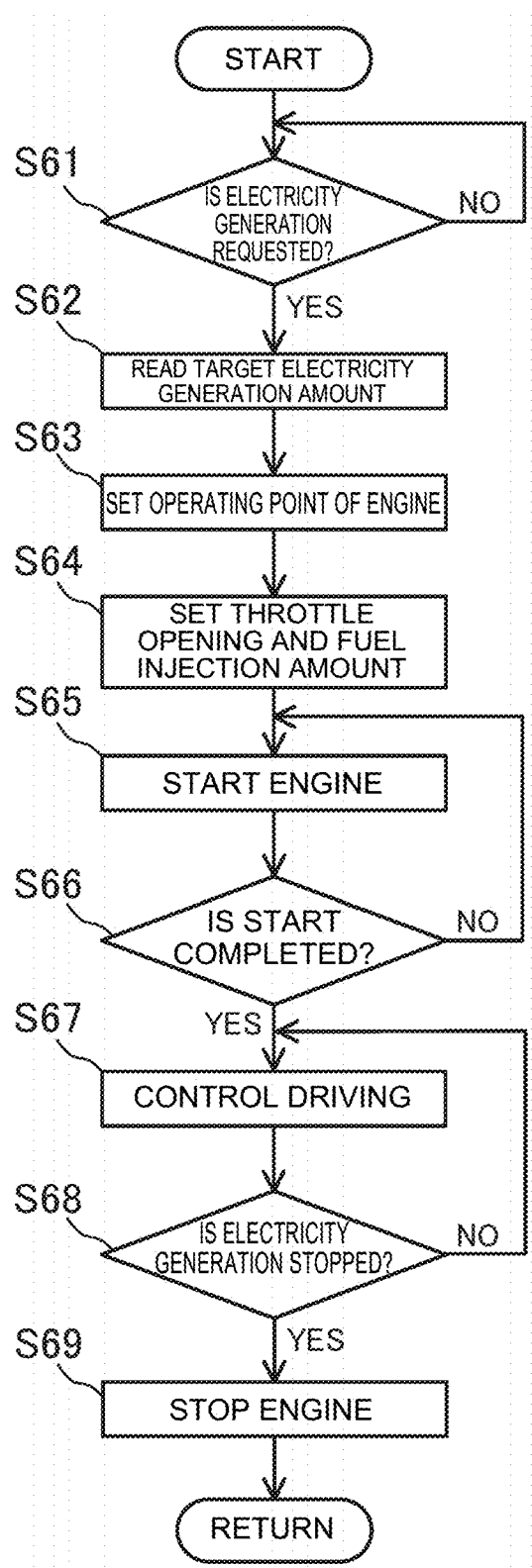
FIG. 4 illustrates an example procedure of engine control.

FIG. 4 illustrates a control procedure of the rotary engine 3 which is executed by the engine ECU 25. First, in step S61 after a start, the engine ECU 25 determines whether or not the electricity generation request from the battery ECU 27 is made. In a case where the electricity generation request is not made, step S61 is repeated in the process, but in a case where the electricity generation request is made, the process progresses to S62.

In step S62, the engine ECU 25 reads the target electricity generation amount calculated by the battery ECU 27, and in next step S63, the engine operating point setting unit 251 of the engine ECU 25 sets an operating point of the rotary engine 3 based on the target electricity generation amount. Further, in step S64, the engine control unit 252 of the engine ECU 25 sets an opening of the throttle valve 394 and a fuel injection amount such that the rotary engine 3 is driven at the set operating point.

In step S65, engine start control is executed. This engine start control is executed by using the generator motor 12 as a starter. Consequently, the engine start control is executed by cooperation between the engine ECU 25 and the motor ECU 26. The start control unit 263 of the motor ECU 26 causes the generator motor 12 to perform power running. A cranking torque is applied to the rotary engine 3.

In step S66, the engine ECU 25 determines whether or not a start of the rotary engine 3 is completed. In a case where the start is not completed, the process returns to step S65, but in a case where the start is completed, the process progresses to S67.

In step S67, the engine control unit 252 of the engine ECU 25 causes the rotary engine 3 to be driven at the set operating point. In next step S68, the engine ECU 25 determines whether or not an instruction to stop electricity generation is made. While no instruction to stop electricity generation is made, the process returns to step S67, and the engine control unit 252 continues driving of the rotary engine 3. When the instruction to stop electricity generation is made, the process progresses from step S68 to step S69. In step S69, the engine ECU 25 stops the rotary engine 3.

(Motor Control in Electricity Generation)

Figure 5:
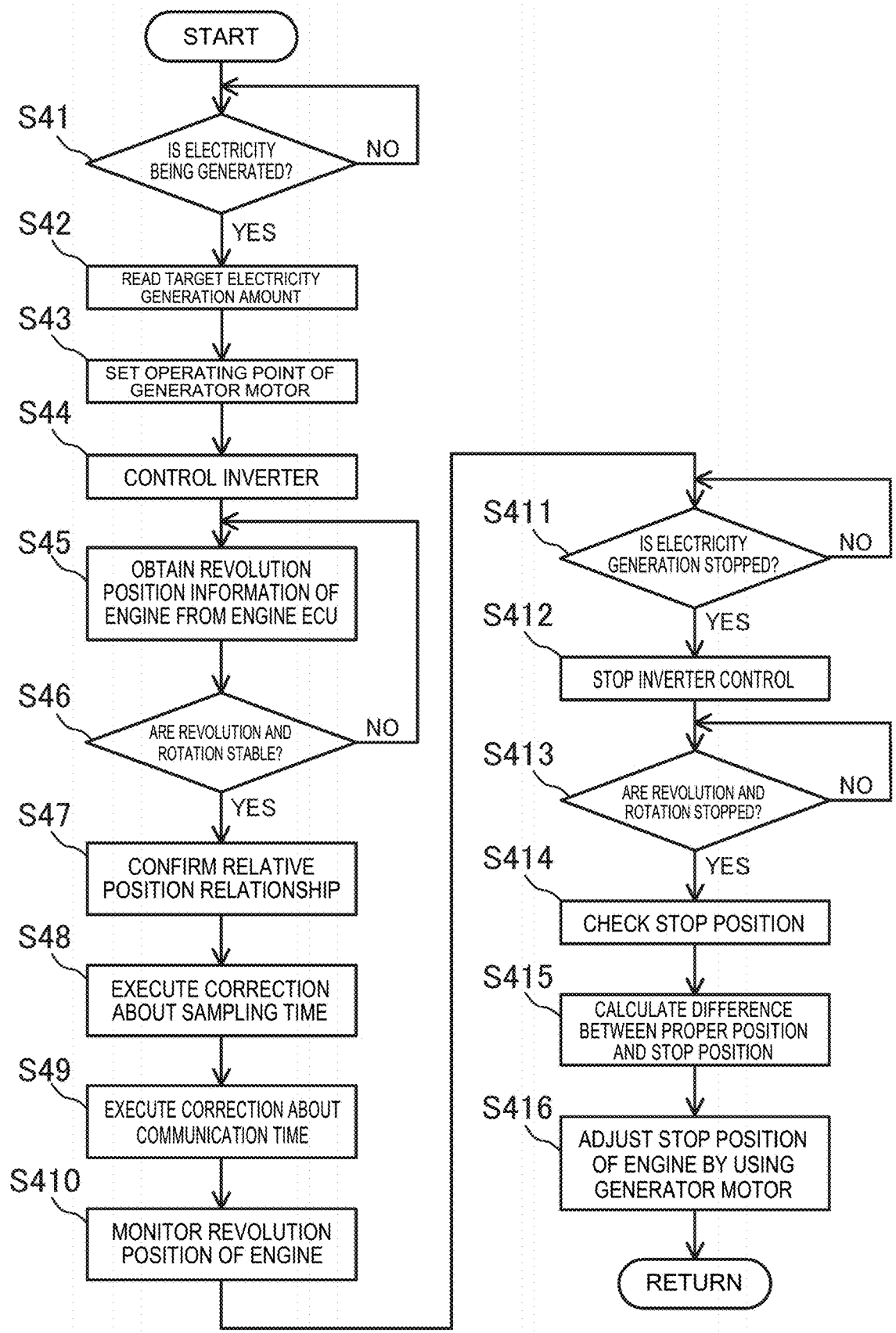
FIG. 5 illustrates an example procedure of motor control.

The flowchart in FIG. 5 illustrates a control procedure of the generator motor 12 in electricity generation, the control procedure being executed by the motor ECU 26. First, in step S41 after a start, the motor ECU 26 determines whether or not electricity generation by the electricity generation request from the battery ECU 27 is being performed. In a case where electricity generation is not being performed, step S41 is repeated in the process, but in a case where electricity generation is being performed, the process progresses to S42.

In step S42, the electricity generation control unit 264 of the motor ECU 26 reads the target electricity generation amount calculated by the battery ECU 27, and in next step S43, the electricity generation control unit 264 sets an operating point of the generator motor 12 based on the target electricity generation amount. Further, in step S44, the electricity generation control unit 264 controls the second inverter 22 such that the generator motor 12 acts at the set operating point.

In step S45, the motor ECU 26 obtains revolution position information of the rotary engine 3 from the engine ECU 25. In step S46, the motor ECU 26 determines whether or not the revolution of the rotary engine 3 and the rotation of the generator motor 12 are stable based on the obtained revolution position information. In a case where the revolution and rotation are not stable, the process returns to step S45, but in a case where the revolution and rotation are stable, the process progresses to S47.

In step S47, the motor ECU 26 confirms the relative position relationship between the revolution position of the rotary engine 3 and the rotation position of the generator motor 12. Then, in step S48, the motor ECU 26 corrects the relative position relationship between the revolution position of the rotary engine 3 and the rotation position of the generator motor 12 based on the difference between a sampling frequency of the engine ECU 25 and a sampling frequency of the motor ECU 26 and on the rotation speed of the generator motor 12. In general, the sampling frequency of the engine ECU 25 is low, and the sampling frequency of the motor ECU 26 is high. The correction corresponding to the difference in the sampling frequency is performed, and the motor ECU 26 can thereby precisely confirm the relative position relationship between the revolution position of the rotary engine 3 and the rotation position of the generator motor 12.

In next step S49, the motor ECU 26 corrects the relative position relationship between the revolution position of the rotary engine 3 and the rotation position of the generator motor 12 based on a delay time in communication through the CAN communication line 28. Accordingly, the motor ECU 26 can further precisely confirm the relative position relationship between the revolution position of the rotary engine 3 and the rotation position of the generator motor 12.

Then, in step S410, the motor ECU 26 monitors the revolution position of the rotary engine 3 based on an output signal of the motor rotation sensor SN4. The rotary engine 3 and the generator motor 12 are mechanically connected together, and the relative position relationship between the revolution position of the rotary engine 3 and the rotation position of the generator motor 12 is confirmed in the above-described steps S47 to S49. Thus, the motor ECU 26 can precisely monitor the revolution position of the rotary engine 3 based on the output signal of the motor rotation sensor SN4.

In step S411, the electricity generation control unit 264 of the motor ECU 26 determines whether or not an instruction to stop electricity generation is made. While no instruction to stop electricity generation is made, step S411 is repeated in the process. The generator motor 12 continues electricity generation driving. When the instruction to stop electricity generation is made, the process progresses to step S412. In step S412, the electricity generation control unit 264 stops inverter control.

In step S413, the motor ECU 26 determines whether or not the revolution of the rotary engine 3 and the rotation of the generator motor 12 are stopped. Until the revolution of the rotary engine 3 and the rotation of the generator motor 12 are stopped, step S413 is repeated in the process. When the revolution of the rotary engine 3 and the rotation of the generator motor 12 are stopped, the process transits to step S414.

In step S414, the motor ECU 26 checks a stop position of the rotary engine 3. At this point, the motor ECU 26 checks the stop position of the rotary engine 3 based on the signal of the motor rotation sensor SN4, which is output while the rotary engine 3 and the generator motor 12 reach stops. As described above, because the relative position relationship between the revolution position of the rotary engine 3 and the rotation position of the generator motor 12 is confirmed while the rotary engine 3 stably revolves and the generator motor 12 stably rotates, the motor ECU 26 can check the stop position of the rotary engine 3 based on the signal of the motor rotation sensor SN4. Because an output of the eccentric-shaft angle sensor SN1 is not stable immediately before the rotary engine 3 stops, precision of information of the revolution position of the engine is low, the information being output by the engine ECU 25. The relative position relationship between the revolution position of the rotary engine 3 and the rotation position of the generator motor 12 is confirmed in advance, and the motor ECU 26 can thereby accurately recognize the stop position of the rotary engine 3 based on the signal of the motor rotation sensor SN4.

In step S415, the stop position control unit 265 of the motor ECU 26 calculates the difference between the revolution position of the stopped rotary engine 3 and a proper stop position of the rotary engine 3. Here, a proper stop position of the rotary engine 3 means such a stop position that when the rotary engine 3 is started in the next time, exhaust emission performance is not lowered and the rotary engine 3 quickly completes a start with a small amount of fuel. In other words, when the revolution position of the stopped rotary engine 3 is deviated from a proper stop position, fuel injected into the operation chamber is not combusted or is discharged while being hardly combusted, and due to that, the exhaust emission performance is lowered. Further, for the amount of fuel which is not combusted, fuel is wasted, and completion of a start of the rotary engine 3 is delayed.

In next step S416, the stop position control unit 265 causes the generator motor 12 to perform power running such that the difference between the stop position of the rotary engine 3 and a proper stop position of the rotary engine 3 is removed and thereby changes the stop position of the rotary engine 3. Because the stop position of the rotary engine 3 is changed by using the generator motor 12 at a timing when charging for the high-voltage battery 23 is completed, consuming electric power of the high-voltage battery 23 for adjustment of the stop position can be permitted.

Note that in a case where no difference is present between the stop position of the rotary engine 3 and a proper stop position of the rotary engine 3, the stop position control unit 265 skips changing steps of the stop position of the rotary engine 3.

In adjustment of the stop position of the rotary engine 3, the stop position control unit 265 causes the generator motor 12 to perform power running such that the rotary engine 3 revolves in a direction of forward revolution. This is because when the rotary engine 3 is revolved in a direction of backward revolution, the side seal 343 might be damaged due to interference between an end of the side seal 343 and the opening of the intake port 391.

FIG. 6 illustrates, as an example, an interference state between the end of the side seal 343 and the opening of the intake port 391. The side seal 343 is mounted on the side surface of the rotor 34. The side seal 343 is disposed along the outer peripheral edge of the triangular rotor 34 to be spanned from the top portion to the top portion of the nearly triangular rotor 34.

A locus of a distal end of the side seal 343 in a case where the rotary engine 3 performs forward revolution does not become a locus which intersects with an edge of the opening of the intake port 391, as indicated as an example by an arrow of a two-dot chain line in the upper part of FIG. 6. In a case where the rotary engine 3 performs forward revolution, the distal end of the side seal 343 does not interfere with the opening of the intake port 391. However, the locus of the distal end of the side seal 343 in a case where the rotary engine 3 performs backward revolution becomes a locus which intersects with the edge of the opening of the intake port 391, as indicated as an example by an arrow of a one-dot chain line in the upper part of FIG. 6. Note that the distal end of the side seal 343 in a case where the rotor 34 performs backward revolution corresponds to an end on the opposite side to the distal end of the side seal 343 in a case where forward revolution is performed.

The lower part of FIG. 6 is a cross-sectional view taken along line A-A in the upper part. As illustrated as an example in the lower part of FIG. 6, a groove 344 is formed in the side surface of the rotor 34. A spring 345 disposed in this groove 344 pushes the side seal 343 toward the side housing 33. Thus, when the distal end of the side seal 343 overlaps with the opening of the intake port 391, the distal end of the side seal 343 is pushed by the spring 345 and thereby protrudes toward an inner side of the intake port 391, in other words, upward in the page of the lower part of FIG. 6.

Thus, when the locus of the distal end of the side seal 343 intersects with the edge of the opening of the intake port 391 due to backward revolution of the rotor 34, the protruded distal end of the side seal 343 collides with a vertical wall 393 of the opening of the intake port 391, and the side seal 343 might be damaged.

Accordingly, in a case where the stop position of the rotary engine 3 is adjusted, the stop position control unit 265 of the motor ECU 26 causes the generator motor 12 to perform power running such that the rotor 34 revolves in the direction of forward revolution. Accordingly, damage to the side seal 343 is avoided.

Note that even in a case where the rotor 34 performs forward revolution, when a back end of the side seal 343 overlaps with the opening of the intake port 391, the back end is pushed by the spring 345 and thereby protrudes toward the inner side of the intake port 391. However, in this case, because the back end of the side seal 343 moves from left to right in the page of the lower part of the FIG. 6, the back end of the side seal 343 does not collide with the edge of the opening of the intake port 391.

Note that in each of the above-described flows, order of steps is not necessarily defined. In the possible range, order of steps can be altered, and processes of plural steps may be capable of being simultaneously executed. Further, in each of the flows, a part of steps can be omitted, and new steps can also be added.

Further, the system illustrated in FIG. 1 is an example, and a system to which the technique disclosed herein is applicable is not limited to the system in FIG. 1. Further, the technique disclosed herein is capable of being widely applied to a control system of a rotary engine, and a structure of a rotary engine is not limited to the structure in FIG. 2.

Further, a reciprocating engine as an internal combustion engine may be installed in the electric vehicle 1.

What is claimed is:

1. A control apparatus for an electric vehicle, the control apparatus comprising: a first motor for traveling which is mechanically connected with a drive wheel of the electric vehicle; a battery which is electrically connected with the first motor and supplies electric power to the first motor; a second motor for electricity generation which is electrically connected with the battery; an engine that has a shaft with which the second motor is mechanically connected and that produces a driving force for moving the second motor; first circuitry configured to drive the engine; second circuitry configured to drive the second motor; and a sensor which outputs an electric signal related to a state of charge (SOC) of the battery to the second circuitry, wherein the second circuitry is further configured to start the engine by causing the second motor to generate power based on the electric signal of the sensor in a case where the SOC of the battery is reduced, cause the second motor to perform electricity generation driving after the engine is started such that the battery is charged, and adjust a stop position of the engine by causing the second motor to generate power subsequently to a stop of the engine by the first circuitry controller in a case where the SOC of the battery becomes high and the second motor finishes the electricity generation driving based on the electric signal of the sensor, wherein the second circuitry is further configured to receive position information of the engine during the electricity generation driving by the second motor from the first circuitry, the position information including a relative position relationship between a revolution position of the engine and a rotation position of the second motor, which is confirmed while the engine stably rotates and the second motor stably rotates, wherein the engine is a rotary engine, and the second circuitry is further configured to adjust the stop position of the engine by causing the shaft of the rotary engine to rotate in a positive rotation direction, wherein in a case where the rotary engine rotates in a positive rotation direction, a distal end of a side seal does not intersect with an opening of an intake port.

2. The control apparatus for the electric vehicle according to claim 1, wherein
the first circuitry and the second circuitry are connected with each other via a communication line,
the first circuitry is further configured to transmit position information of the engine to the second circuitry via the communication line, and
the second circuitry is further configured to adjust the stop position of the engine based on the position information from the first controller.

3. A method for controlling an electric vehicle, comprising: starting an engine by causing a motor to generate power based on an electric signal of a sensor in a case where a state of charge (SOC) of a battery is reduced; causing the motor to perform electricity generation driving after the engine is started such that the battery is charged; adjusting a stop position of the engine by causing the motor to generate power subsequently to a stop of the engine in a case where the SOC of the battery becomes high and the motor finishes the electricity generation driving based on the electric signal of the sensor and receiving, at the motor, position information of the engine during the electricity generation driving by the motor, the position information including a relative position relationship between a revolution position of the engine and a rotation position of the motor, which is confirmed while the engine stably rotates and the motor stably rotates, wherein the engine is a rotary engine, and adjusting the stop position of the engine by causing a shaft of the rotary engine to rotate in a positive rotation direction, wherein in a case where the rotary engine rotates in a positive rotation direction, a distal end of a side seal does not intersect with an opening of an intake port.

4. The method of claim 3, further comprising:
transmitting the position information of the engine to the motor; and
adjusting the stop position of the engine based on the position information.

5. A non-transitory computer readable storage medium storing computer readable instructions thereon which, when executed by a computer, cause the computer to perform a method, the method comprising: starting an engine by causing a motor to generate power based on an electric signal of a sensor in a case where a state of charge (SOC) of a battery is reduced; causing the motor to perform electricity generation driving after the engine is started such that the battery is charged; adjusting a stop position of the engine by causing the motor to generate power subsequently to a stop of the engine in a case where the SOC of the battery becomes high and the motor finishes the electricity generation driving based on the electric signal of the sensor and receiving, at the motor, position information of the engine during the electricity generation driving by the motor, the position information including a relative position relationship between a revolution position of the engine and a rotation position of the motor, which is confirmed while the engine stably rotates and the motor stably rotates; adjusting the stop position of the engine by causing a shaft of the engine to rotate in a positive rotation direction, wherein in a case where the rotary engine rotates in a positive rotation direction, a distal end of a side seal does not intersect with an opening of an intake port.

6. The non-transitory computer-readable storage medium of claim 5, further comprising:
   transmitting the position information of the engine to the motor; and
   adjusting the stop position of the engine based on the position information.

* * * * *